Dec. 1, 1942.  O. G. DUNCAN  2,303,622
STORAGE BATTERY
Filed Feb. 8, 1941   2 Sheets-Sheet 1
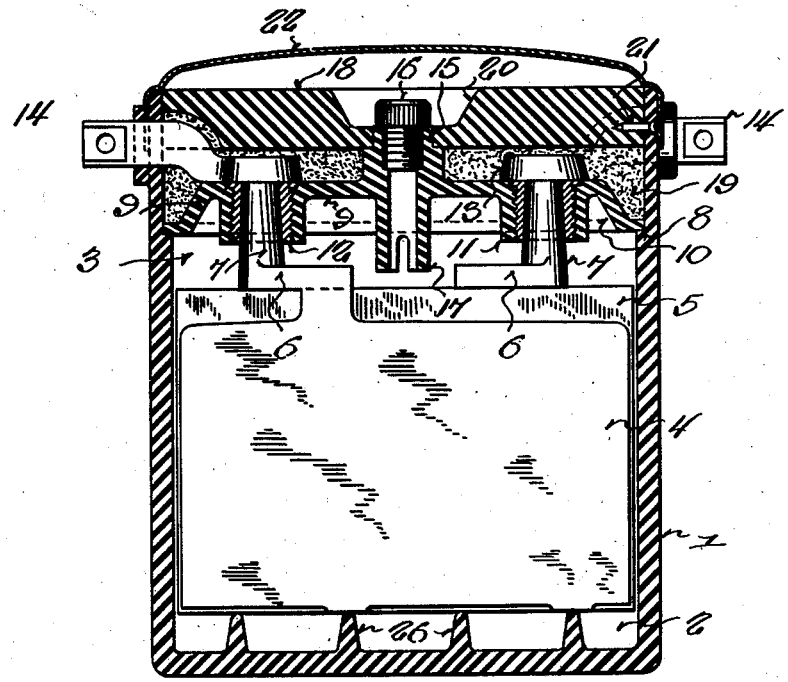
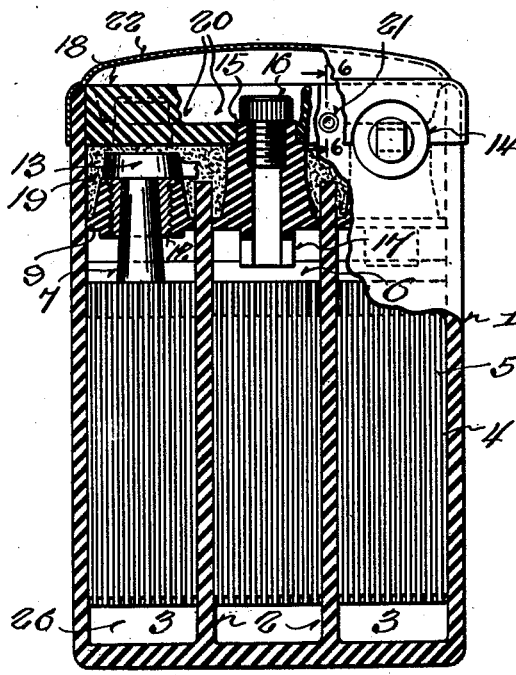
Inventor
O. G. Duncan
By
Attorneys Dec. 1, 1942.    O. G. DUNCAN    2,303,622
STORAGE BATTERY
Filed Feb. 8, 1941    2 Sheets-Sheet 2

Inventor
O. G. Duncan

By *Young Young*

Attorneys

Patented Dec. 1, 1942

2,303,622

UNITED STATES PATENT OFFICE 2,303,622

STORAGE BATTERY

Owen G. Duncan, Racine, Wis.

Application February 8, 1941, Serial No. 378,001

3 Claims. (Cl. 136—170)

This invention pertains to storage batteries, and more particularly to small, compact motorcycle batteries, in which the posts, connectors, and end terminals are entirely covered with compound to provide an airtight, acid-proof seal.

The invention has primarily for its object to simplify the structure of batteries of the foregoing type, in which the cover, connections, and sealing compound are entirely enclosed within the battery casing by an auxiliary cover secured within the top of the casing, and provided with a recess surrounding the filling spouts and vent caps, whereby the filling operation is facilitated, and damage to the caps and spouts from contact with obstructions is avoided, and spilling of electrolyte over the top of the battery is reduced to a minimum.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 is a vertical section through a battery constructed in accordance with the preferred form of the invention, the same being taken on the line 1—1 of Figure 3;

Figure 2 is a transverse, vertical section taken on the line 2—2 of Figure 3;

Figure 3:
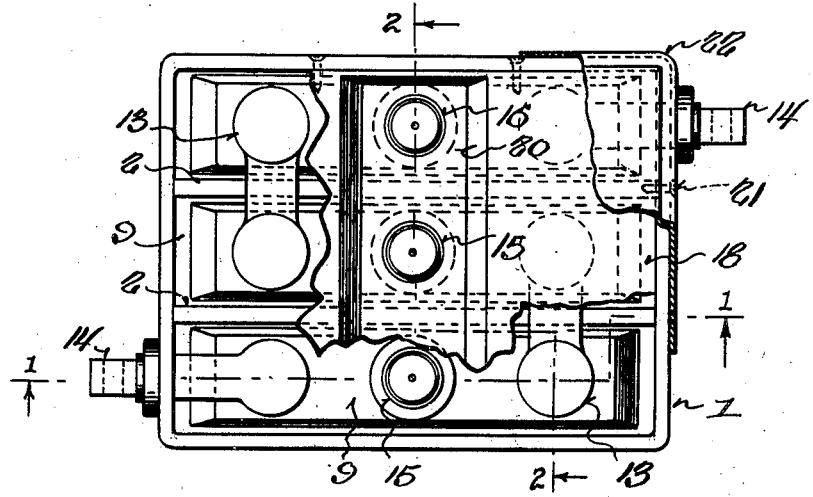
Figure 3 is a plan view with parts broken away, and the sealing compound eliminated to better illustrate structural features.
Figure 4:
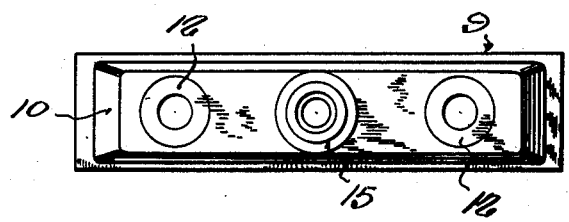
Figure 4 is a plan view of one of the cell covers.
Figure 5:
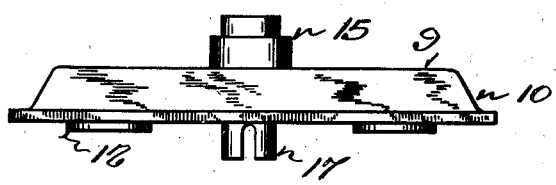
Figure 5 is an elevation of the same.
Figure 6:
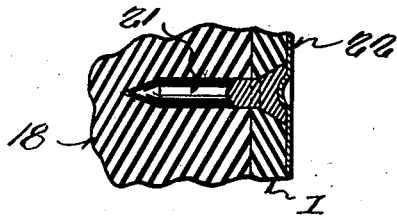
Figure 6 is an enlarged, fragmentary sectional view taken on the line 6—6 of Figure 2.

Referring now more particularly to the accompanying drawings, in which a three-cell battery is illustrated, the numeral 1 designates a molded casing, provided with longitudinal partitions 2 forming a plurality of cell compartments 3. Mounted within each compartment is a plurality of positive and negative plates 4 spaced by the usual separators 5, and having their lower edges supported upon spaced transverse webs 26 molded in the casing. The plates 4 of like polarity are connected by straps 6, which carry terminal posts 7.

The side walls of the compartments are provided with inner shoulders 8 upon which individual covers 9 are supported, the covers being of the molded type and provided with depending skirts 10.

As best shown in Figure 1, the covers 9 are provided with depending bosses 11, in which sleeves 12 are molded for reception of the posts 7, which project above the top of the covers 10. Secured to the upper ends of the posts 7 by lead burning, or other conventional practice, are the usual cross connectors 13, and end terminals 14 that project through the side walls of the casing 1. Each cover is provided on its upper face with a filling spout 15, the upper ends of which are closed by threaded vent caps 16. The lower end of the spouts terminate in depending extensions 17, while the upper ends are shouldered to support an auxiliary cover 18, the entire space between the cell covers and the auxiliary cover being filled with a sealing compound 19 to form an airtight end, acid-proof seal.

As best shown in Figure 1, the cover 18 is provided with a recess 20, which surrounds the filling spouts and vent caps 16, thus protecting them against damage from contact with obstructions.

The auxiliary cover 18 is preferably secured within the top of the casing 1 by a plurality of pins or screws 21, and, if desired, a metal cap 22 may be provided to prevent the accumulation of dirt within the recess 20. To detachably secure the cap 22 on the casing, the heads of the pins 21 may be recessed for reception of nibs formed in the resilient skirt of the cap 22, thus allowing the cap to be readily snapped on or off, when desired. Thus the recessed skirt of the cap not only confines the cap by engaging the heads of the pins but said feature also prevents the pins from displacement due to vibration of the entire battery unit, thereby performing a double function.

The pins 21 can be formed of any desired material, but preferably of insulating composition, such as vulcanized rubber or fibrous material.

In assembly, the pins may be inserted through the casing in heated condition, to securely seal the same in the cover.

From the foregoing explanation, considered in connection with the accompanying drawing, it will be apparent that an exceedingly simple, compact and inexpensive storage battery has been devised, which can be easily assembled, and in which all connectors are completely imbedded in a sealing compound that serves as an airtight and acid-proof seal.

It will be further appreciated that the recessed auxiliary cover not only protects the filling spouts and vent caps from damage, but also serves to confine small quantities of electrolyte that may splash through the vent caps, thus preventing the same from running over the top of the battery, and forms a dead air space between the cap 22 and auxiliary cover 18, to further insure sealing at the top of the battery.

I claim:

1. A storage battery comprising, a molded casing provided with partitions forming a plurality of compartments, shoulders formed on the inner face of the casing adjacent its upper end, an individual cover for each of said compartments seated upon the shoulders, positive and negative plates supported within said compartments, straps connecting plates of like polarity, terminal posts carried by said straps and projecting through said covers, connectors for said posts, a shoulder filling spout having a shoulder projecting upwardly from the top of each of said covers, sealing compound entirely covering said posts and connectors and upon a level with the spout shoulder, an auxiliary cover secured within the top of said casing and provided with openings receiving the spouts and a recess surrounding the upper ends of said spouts, the lower face of the auxiliary cover being fitted upon the spout shoulders and resting upon the top surface of the sealing compound, and vent caps for the projecting ends of said spouts, the cover being supported upon the spout shoulders and resting upon the top surface of the sealing compound.

2. A storage battery comprising, a molded casing provided with partitions forming a plurality of plate compartments having inner shoulders formed in the side walls of said compartments, covers having depending peripheral skirts supported upon said shoulders, positive and negative plates supported within said cells, straps connecting plates of like polarity, terminal posts carried by said straps projecting through said cover, connectors for said posts, a filling spout projecting upwardly from the top of each of said covers and provided with an external shoulder spaced above said cover, a sealing compound entirely covering said post, covers, and connectors, an auxiliary cover secured within the top of said casing and supported upon the filling spout shoulders, means for fastening said auxiliary cover within the top of said casing, said auxiliary cover being provided with a recess surrounding the upper ends of said spouts, and vent caps for the projecting ends of said spouts, said vent caps being positioned below the top surface of said auxiliary cover.

3. A storage battery comprising, a molded casing provided with partitions forming a plurality of plate compartments, an individual cover for each of said compartments, positive and negative plates supported within said compartments, straps connecting plates of like polarity, terminal posts carried by said straps and projecting through said covers, connectors for the projected ends of said posts, a filling spout projecting upwardly from the top of each of said covers, sealing compound having an upper level surface entirely covering said posts, covers, and connectors, an auxiliary cover for the top of said casing engaging the top surface of the compound and provided with a recess surrounding the upper ends of said spouts, vent caps for the projecting ends of said spouts, pins extending through the casing into said auxiliary cover to fasten the same within the casing, the outer ends of said pins being recessed, and a protective cap for the top of said casing and including a peripheral skirt provided with nibs for releasable engagement in the recesses in said pins.

OWEN G. DUNCAN.